United States Patent
Chun

(10) Patent No.: US 9,959,297 B2
(45) Date of Patent: May 1, 2018

(54) ELECTRONIC DEVICE AND METHOD FOR AUTOMATICALLY STORING URL BY CALCULATING CONTENT STAY VALUE

(71) Applicant: Samsung Electronics Co. Ltd., Suwon-si, Gyeonggi-do (KR)

(72) Inventor: Jin-Wook Chun, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 470 days.

(21) Appl. No.: 13/962,257

(22) Filed: Aug. 8, 2013

(65) Prior Publication Data

US 2014/0059092 A1 Feb. 27, 2014

(30) Foreign Application Priority Data

Aug. 24, 2012 (KR) .................. 10-2012-0093260

(51) Int. Cl.
*G06F 17/30* (2006.01)

(52) U.S. Cl.
CPC .. *G06F 17/30312* (2013.01); *G06F 17/30884* (2013.01)

(58) Field of Classification Search
CPC ......... G06F 17/30884; G06F 17/30882; G06F 1/1694; G06F 2200/1637; G06F 17/30902; G06F 17/30867; G06F 17/30887
USPC ......... 707/748, 738; 715/206, 826; 345/684; 709/218
See application file for complete search history.

(56) References Cited

U.S. PATENT DOCUMENTS

| | | | |
|---|---|---|---|
| 5,813,007 A * | 9/1998 | Nielsen | |
| 6,041,360 A * | 3/2000 | Himmel et al. | 709/245 |
| 6,100,890 A * | 8/2000 | Bates et al. | 715/826 |
| 6,745,367 B1* | 6/2004 | Bates | G06F 17/30867 707/E17.109 |
| 6,976,070 B1* | 12/2005 | Hoashi | G06F 17/30867 707/999.104 |
| 7,024,404 B1* | 4/2006 | Gerasoulis et al. | |
| 7,107,406 B2* | 9/2006 | Kurasugi | G06F 17/30902 707/E17.12 |
| 7,647,314 B2* | 1/2010 | Sun | G06F 17/30864 706/12 |
| 8,200,617 B2* | 6/2012 | Spivack et al. | 707/602 |
| 8,321,383 B2* | 11/2012 | Schumacher et al. | 707/688 |

(Continued)

FOREIGN PATENT DOCUMENTS

| | | | | |
|---|---|---|---|---|
| CN | 10101944104 A | * | 1/2011 | ............. G06F 17/30 |
| JP | 2002-215623 A | | 8/2002 | |

(Continued)

OTHER PUBLICATIONS

Li et al. Evaluation method and equipment for importance of webpage sub-blocks, Jan. 12, 2011, Google Patent, pp. 1-15.*

(Continued)

*Primary Examiner* — Frantz Coby
(74) *Attorney, Agent, or Firm* — Jefferson IP Law, LLP

(57) ABSTRACT

An electronic device and a method for automatically storing a Uniform Resource Locator (URL) by calculating a content stay value are provided. The method includes detecting a weight value of contents displayed, calculating a stay value using the detected weight value, and when the calculated stay value is greater than a set value, storing the URL of the contents.

18 Claims, 10 Drawing Sheets

(56) References Cited

U.S. PATENT DOCUMENTS

| | | | |
|---|---|---|---|
| 8,443,452 B2* | 5/2013 | Koulinitch | G06F 21/6218 726/26 |
| 8,538,736 B1* | 9/2013 | Paquet | 703/6 |
| 8,538,952 B2* | 9/2013 | Kim et al. | 707/713 |
| 8,560,630 B2* | 10/2013 | Malkhi | H04L 67/24 709/217 |
| 8,621,092 B2* | 12/2013 | Jacob | G06F 17/30887 709/218 |
| 8,739,020 B2* | 5/2014 | Khosla | H04L 67/26 715/206 |
| 8,843,463 B2* | 9/2014 | Moritz et al. | 707/705 |
| 9,251,526 B2* | 2/2016 | Takami | G06Q 30/02 |
| 2002/0000468 A1* | 1/2002 | Bansal | G06F 17/30879 235/462.15 |
| 2002/0033847 A1* | 3/2002 | Masthoff | 345/776 |
| 2002/0078089 A1* | 6/2002 | Bade et al. | 707/513 |
| 2002/0156832 A1* | 10/2002 | Duri et al. | 709/203 |
| 2002/0198962 A1* | 12/2002 | Horn | G06F 17/30876 709/218 |
| 2004/0083389 A1* | 4/2004 | Yoshida | G06F 11/3495 726/22 |
| 2007/0061415 A1* | 3/2007 | Emmett et al. | 709/217 |
| 2008/0177858 A1* | 7/2008 | Aarnio et al. | 709/217 |
| 2008/0177994 A1* | 7/2008 | Mayer | G06F 9/4418 713/2 |
| 2009/0094213 A1* | 4/2009 | Wang | G06F 17/30867 |
| 2009/0144240 A1* | 6/2009 | Singh et al. | 707/3 |
| 2010/0031130 A1* | 2/2010 | Yu | H04L 1/0045 714/796 |
| 2010/0031133 A1* | 2/2010 | Nastacio | 715/206 |
| 2010/0082576 A1* | 4/2010 | Walker et al. | 707/706 |
| 2010/0241597 A1* | 9/2010 | Chen et al. | 706/12 |
| 2010/0257171 A1* | 10/2010 | Shekhawat | G06Q 30/02 707/738 |
| 2011/0258216 A1* | 10/2011 | Supakkul et al. | 707/769 |
| 2012/0005216 A1* | 1/2012 | Moritz et al. | 707/748 |
| 2012/0278742 A1 | 11/2012 | Takami | |
| 2013/0159298 A1* | 6/2013 | Mason | G06F 17/30867 707/728 |
| 2013/0176346 A1* | 7/2013 | Chen | G06F 1/1694 345/684 |
| 2014/0019267 A1* | 1/2014 | Stoliartchouk | G06Q 30/0277 705/14.73 |

FOREIGN PATENT DOCUMENTS

| | | |
|---|---|---|
| KR | 10-2006-0115488 A | 11/2006 |
| KR | 10-2007-0010617 A | 1/2007 |
| KR | 10-2007-0037933 A | 4/2007 |
| KR | 10-2011-0124443 A | 11/2011 |
| KR | 10-2012-0021387 A | 3/2012 |
| TW | 201133257 A1 | 10/2011 |

OTHER PUBLICATIONS

Cole, Linda, The Dastardly "favicon.ico not found" Error, Web Developer's Virtual Library, Aug. 3, 1999, http://www.wdvl.com/Authoring/Design/Images/Favicon/icon.html.

* cited by examiner

| CONTENT TYPE / CONTENT WEIGHT VALUE | IMAGE | AUDIO | FLASH | TEXT | VIDEO | ... |
|---|---|---|---|---|---|---|
| 0.5 | 200KB | 300KB | 5MB | 50KB | 20MB | |
| 1 | 400KB | 600KB | 10MB | 100KB | 25MB | |
| 1.5 | 600KB | 900KB | 15MB | 150KB | 30MB | |
| 2 | 800KB | 1200KB | 20MB | 200KB | 35MB | |
| ⋮ | | | | | | |

FIG.3

| CONTENT WEIGHT VALUE \ CONTENT TYPE | IMAGE | AUDIO | FLASH | TEXT | VIDEO | ... |
|---|---|---|---|---|---|---|
| 0.5 | 200KB | 300KB | 5MB | 50KB | 20MB | |
| 1 | 400KB | 600KB | 10MB | 100KB | 25MB | |
| 1.5 | 600KB | 900KB | 15MB | 150KB | 30MB | |
| 2 | 800KB | 1200KB | 20MB | 200KB | 35MB | |
| ⋮ | | | | | | |

| CONTENT TYPE / CONTENT WEIGHT VALUE | IMAGE | AUDIO | FLASH | TEXT | VIDEO | ... |
|---|---|---|---|---|---|---|
| 0.5 | 200KB | 300KB | 5MB | 50KB | 20MB | |
| 1 | 400KB | 600KB | 10MB | 100KB | 25MB | |
| 1.5 | 600KB | 900KB | 15MB | 150KB | 30MB | |
| 2 | 800KB | 1200KB | 20MB | 200KB | 35MB | |
| ⋮ | | | | | | |

| CONTENT TYPE / CONTENT WEIGHT VALUE | IMAGE | AUDIO | FLASH | TEXT | VIDEO | ... |
|---|---|---|---|---|---|---|
| 0.5 | 200KB | 300KB | 5MB | 50KB | 20MB | |
| 1 | 400KB | 600KB | 10MB | 100KB | 25MB | |
| 1.5 | 600KB | 900KB | 15MB | 150KB | 30MB | |
| 2 | 800KB | 1200KB | 20MB | 200KB | 35MB | |
| ⋮ | | | | | | |

| CONTENT TYPE / CONTENT WEIGHT VALUE | IMAGE | AUDIO | FLASH | TEXT | VIDEO | ... |
|---|---|---|---|---|---|---|
| 0.5 | 200KB | 300KB | 5MB | 50KB | 20MB | |
| 1 | 400KB | 600KB | 10MB | 100KB | 25MB | |
| 1.5 | 600KB | 900KB | 15MB | 150KB | 30MB | |
| 2 | 800KB | 1200KB | 20MB | 200KB | 35MB | |
| ⋮ | | | | | | |

ELECTRONIC DEVICE AND METHOD FOR AUTOMATICALLY STORING URL BY CALCULATING CONTENT STAY VALUE

PRIORITY

This application claims the benefit under 35 U.S.C. § 119(a) of a Korean patent application filed on Aug. 24, 2012 in the Korean Intellectual Property Office and assigned Serial No. 10-2012-0093260, the entire disclosure of which is hereby incorporated by reference.

BACKGROUND OF THE INVENTION

1. Field of the Invention

The present invention relates to an electronic device and a method for automatically storing a Uniform Resource Locator (URL). More particularly, the present invention relates to a method for automatically storing a URL of contents by calculating a stay value of the contents displayed.

2. Description of the Related Art

When browsing web pages, a user can frequently access a website according to his/her liking and interest. In this case, the user can easily access his/her favorite website by storing a corresponding URL without having to enter the URL of the website in an address bar every time he/she accesses the corresponding website.

However, in the related art, the user needs to manually store the URLs of his/her websites of interest one by one. For example, when the user accesses several websites and finds his/her favorite contents, the user frequently forgets to save the URL of the corresponding contents while surfing the websites.

Therefore, a need exists for an electronic device for automatically storing a URL by obtaining a user's preference without having to enter the user's favorite website addresses one by one.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for automatically storing a Uniform Resource Locator (URL) of contents by calculating a stay value of the contents displayed.

Another aspect of the present invention is to provide an apparatus and a method for obtaining a user's favorite website by weighting contents, rather than merely storing a website accessed for a long time.

Yet another aspect of the present invention is to provide an apparatus and a method for determining whether a user is actually browsing contents displayed by detecting a tilt.

In accordance with an aspect of the present invention, an operating method of an electronic device is provided. The method includes detecting a weight value of contents displayed, calculating a stay value using the detected weight value, and when the calculated stay value is greater than a set value, storing a URL of the contents.

The operating method may further include detecting a tilt using at least one of a gravity sensor and a gyro sensor, and determining that the detected tilt falls within a set tilt range.

The contents may include at least one of a text, an image, and a media player.

The detecting of the weight value of the displayed contents may include determining a type of the displayed contents, detecting weight values according to the content type, and adding the detected weight values.

The detecting of the weight values according to the content type may include detecting a content capacity according to the content type, and detecting content weight values according to the detected content capacity by referring to a set weight table.

The weight table may assign the weight value according to the content capacity.

The stay value may be a product of the detected weight value and a set time.

The operating method may further include comparing the calculated stay value and the set value.

The storing of the content URL may include storing the URL and the calculated stay value together.

The stored URL may be arranged in a descending order of the stored stay value.

In accordance with another aspect of the present invention, an electronic device is provided. The electronic device includes a processor unit for detecting a weight value of contents displayed and for calculating a stay value using the detected weight value and a memory for, when the calculated stay value is greater than a set value, storing a URL of the contents.

The electronic device may further include a motion sensor for detecting a tilt. The processor unit determines that the detected tilt falls within a set tilt range.

The contents may include at least one of a text, an image, and a media player.

The processor unit may determine a type of the displayed contents, detect weight values according to the content type, and add the detected weight values.

The processor unit may detect a content capacity according to the content type, and detect content weight values according to the detected content capacity by referring to a set weight table.

The weight table may assign the weight value according to the content capacity.

The stay value may be a product of the detected weight value and a set time.

The processor unit may include the calculated stay value and the set value.

The memory may store the URL and the calculated stay value together.

The stored URL may be arranged in a descending order of the stored stay value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 illustrates a weight table according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
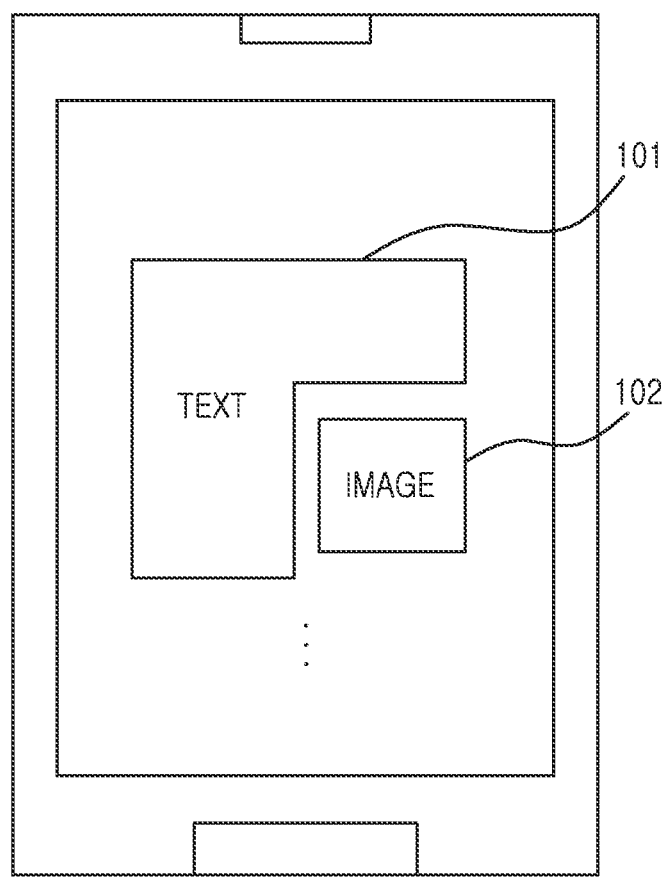
FIG. 1 illustrates an electronic device for automatically storing a Uniform Resource Locator (URL) by calculating a stay value of contents according to an exemplary embodiment of the present invention.

FIG. 1 illustrates an electronic device for automatically storing a Uniform Resource Locator (URL) by calculating a stay value of contents according to an exemplary embodiment of the present invention.

Referring to FIG. 1, it is assumed that the electronic device currently accesses a particular website and URL information of the corresponding website is not stored in the electronic device. It is also assumed that a touch screen of the electronic device displays a text 101 and an image 102 of the accessing website.

Based on those assumptions, the electronic device detects a weight value of contents displayed on the touch screen. Herein, the contents can include at least one of a text, an image, and a media player. More specifically, the media player can include a video file and a sound file, and the image can include a flash. The weight value of the contents can be defined by dividing a capacity of the contents displayed by the electronic device by the given weight value of a weight table. The weight value detection of the contents displayed on the touch screen of the electronic device is described below.

First, the electronic device determines a type of the contents displayed on the touch screen. More specifically, the electronic device determines the type of the contents of the current web page. For example, according to the above-stated assumptions, the electronic device can confirm that the contents displayed on the touch screen are the text 101 and the image 102. For example, the electronic device can confirm that the touch screen displays the text 101 and the single image 102.

The electronic device confirming the type of the contents displayed on the touch screen detects the weight values according to the content type. More specifically, the electronic device detects the content capacities according to the content type, and detects the content weight values according to the content type based on a set weight table. First, the electronic device detects the content capacities according to the content type. The electronic device detects the text capacity and the image capacity. Herein, the text and image capacities can differ according to text and image sizes. The electronic device can extract the content type based on a markup language.

Thereafter, the electronic device detects the weight values of the contents according to the detected content capacities based on the set weight table. Herein, the weight table can be defined as a table which arranges the weight values based on the content type and the content capacity. More specifically, the weight table assigns the weight value according to the content type and the content capacity. The weight value may be set to a default value or a particular value according to a user's selection. For example, the electronic device detects the weight value per content type currently detected, by referring to the set weight table. For example, it is provided that the electronic device detects the text of the capacity 100 KiloBytes (KB) and the image of the capacity 30 MegaBytes (MB), and that the electronic device confirms the weight value 1 for the 100 KB-capacity text and the weight value 1 for the 60 MB-capacity image based on the weight table. In this case, the electronic device can obtain the weight value 1 as the text weight value and the weight value 0.5 as the image weight value.

Herein, the electronic device detects the content weight value according to the type of the contents displayed on the touch screen in order to determine whether the user actually browses the corresponding web page. More specifically, the electronic device stores the URL of the web page browsed by the user, rather than merely storing the URL by considering only the user access time of the corresponding web page. For example, the electronic device applies the different content weight value according to the content type of the web page. For example, when the electronic device displays the contents including only the image, the user can perceive the image within a short time. Similarly, when the electronic device displays the contents including only the text, it is apparent that the user requires a longer time to perceive those contents than the contents including only the image. Accordingly, it is advantageous to apply a low content weight value to the contents, such as an image or a flash, and to apply a high content weight value to the contents, such as a text and a video, among the contents displayed on the touch screen of the electronic device.

Thereafter, the electronic device adds up the detected weight values. More specifically, the electronic device obtains the weight value sum by adding up the detected weight values on the content basis. In this exemplary embodiment, since the weight value of the text is 1 and the weight value of the image is 0.5, the electronic device can obtain the weight value 1.5 by adding the detected text weight value 1 and the detected image weight value 0.5.

Using the weight value sum, the electronic device calculates a stay value. Herein, the stay value can be defined as a product of a set time and the detected weight value sum on the content basis. For example, provided that the set time is 3 minutes, the electronic device can obtain the stay value 270 by multiplying the weight value sum 1.5 by the set time 180.

Thereafter, the electronic device compares the calculated stay value and a set value, and automatically stores the content URL when the calculated stay value is greater than the set value. For example, provided that the set value is 250, the electronic device determines that the calculated stay value 270 is greater than the set value 250 and thus, automatically stores the content URL. Even when the user browses the web page and finds his/her favorite contents, the related art has to manually store the corresponding content URL one by one. By contrast, an exemplary embodiment of the present electronic device can automatically store the content URL when the calculated stay value is greater than the set value. For example, an exemplary embodiment of the present invention can detect the user's favorite website by weighting the contents and store the corresponding URL, rather than merely storing the website accessed for a long time, to thus enhance the user access.

Figure 2A:
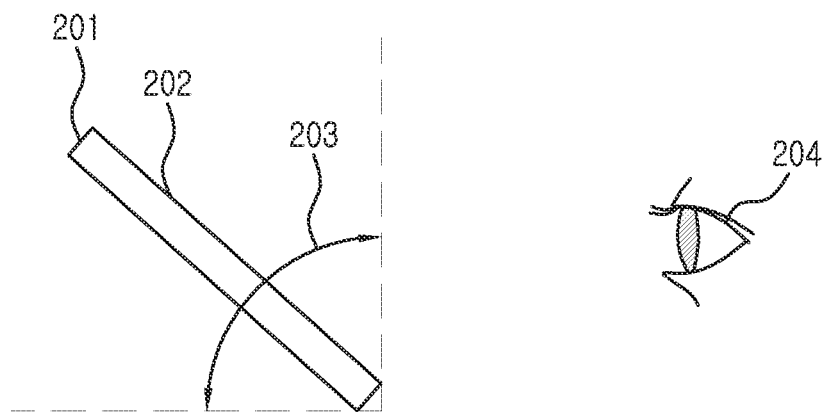
FIGS. 2A and 2B illustrate a tilt detection in an electronic device according to an exemplary embodiment of the present invention.
Figure 2B:
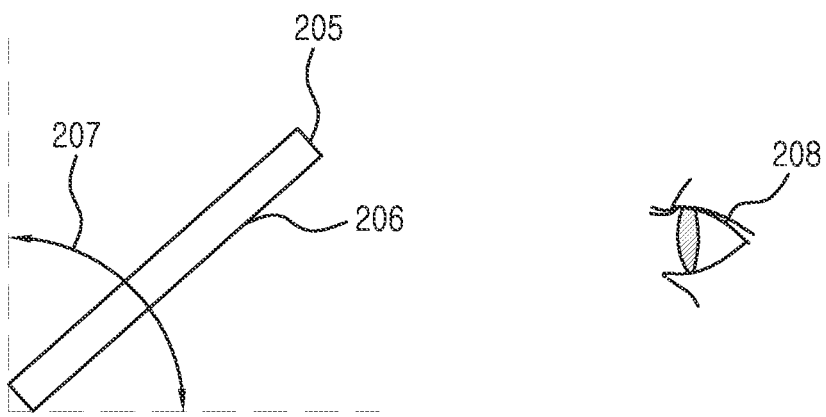

FIGS. 2A and 2B illustrate a tilt detection in an electronic device according to an exemplary embodiment of the present invention.

Referring to FIG. 2A, the tilt detected by the electronic device falls within a set range. When determining the access to a certain website, the electronic device 201 determines whether the detected tilt falls within the set range 203. More specifically, to determine whether the user actually browses the corresponding website, the electronic device 201 detects its tilt which changes in real time and thus, determines whether the tilt falls within the set range. The electronic device detects the tilt changing in real time in order to determine whether the user actually searches and browses the accessed website. Herein, the electronic device can detect the tilt using at least one of a gravity sensor and a gyro sensor. For example, the electronic device 201 detects the weight value of the displayed contents only when the detected tilt falls within the set range 203. Advantageously, when the touch screen 202 of the electronic device 201 is tilted at an angle between 0 degree and 90 degrees, the electronic device 201 can determine that a user's eye 204 is actually browsing the displayed website. More specifically, when the touch screen 202 of the electronic device 201 is tilted at an angle between 0 degree and 90 degrees, the electronic device 201 determines that the detected tilt falls within the set range 203. In conclusion, when the detected tilt falls within the set range 203, the electronic device 201 determines that the user is actually browsing the contents of the corresponding website and detects the weight value of the displayed contents. Hence, even with the long access time in the certain website, the electronic device 201 stores the corresponding URL based on a specific condition only when the user actually browses the corresponding website.

Referring to FIG. 2B, the tilt detected by the electronic device does not fall within the set range. When determining the access to a certain website, the electronic device 205 determines whether the detected tilt falls within the set range. More specifically, to determine whether the user actually browses the corresponding website, the electronic device 205 detects its tilt which changes in real time and thus determines whether the tilt falls within the set range. The electronic device detects the tilt changing in real time in order to determine whether the user actually searches and browses the accessed website. For example, the electronic device 205 detects the weight value of the displayed contents only when the detected tilt falls within the set range. Advantageously, when the touch screen 206 of the electronic device 205 is tilted at the angle between 0 degree and 90 degrees, the electronic device 205 can determine that a user's eye 208 is actually browsing the displayed website. More specifically, when the touch screen 206 of the electronic device 205 is tilted at an angle between 0 degree and 90 degrees, the electronic device 205 determines that the detected tilt falls within the set range 207. Since the detected tilt falls beyond the set range 207, that is, falls between 90 degrees and 180 degrees, the electronic device 205 can determine that the user's eye 208 is not actually browsing the website displayed on the touch screen 206 of the electronic device 205. In conclusion, upon determining the detected range out of the set range, the electronic device determines that the user actually browses the contents of the corresponding website and thus, detects the weight value of the displayed contents. Hence, even with the long access time in the certain website, the electronic device 205 stores the corresponding URL based on a specific condition only when the user actually browses the corresponding website.

FIG. 3 illustrates a weight table according to an exemplary embodiment of the present invention.

Referring to FIG. 3, the weight table can be defined as a table which arranges the weight values based on the content capacity. The weight table assigns the content weight values based on the content type as shown in FIG. 3. More specifically, the weight table assigns the weight values based on the content type and the content capacity, and the weight value may be set to a default value or a particular value according to the user's selection. For example, the electronic device applies the different content weight value according to the content type of the web page. For example, when the electronic device displays the contents including only the image, the user can perceive the image within a short time. Similarly, when the electronic device displays the contents including only the text, it is apparent that the user requires a longer time to perceive the contents than the contents including only the image. Accordingly, it is advantageous to apply a low content weight value to the contents, such as an image or a flash, and to apply a high content weight value to the contents, such as a text and a video, among the contents displayed on the touch screen of the electronic device.

The electronic device detects the weight value on the detected content type basis by referring to the set weight table. For example, it is provided that the electronic device detects the 200 KB-capacity text and the 400 KB-capacity image. When detecting the weight value on the detected content type basis using the weight table of FIG. 3, the electronic device can confirm the text weight value of 2 and the image weight value of 1. Herein, the electronic device detects the content weight values based on the content type displayed on the touch screen in order to determine whether the user actually browses the corresponding web page. More specifically, the electronic device stores the URL of the web page actually browsed by the user, rather than merely storing the URL by considering only the user access time of the corresponding web page. For example, the electronic device applies the different content weight value according to the content type of the web page.

Figures 4A, 4B:
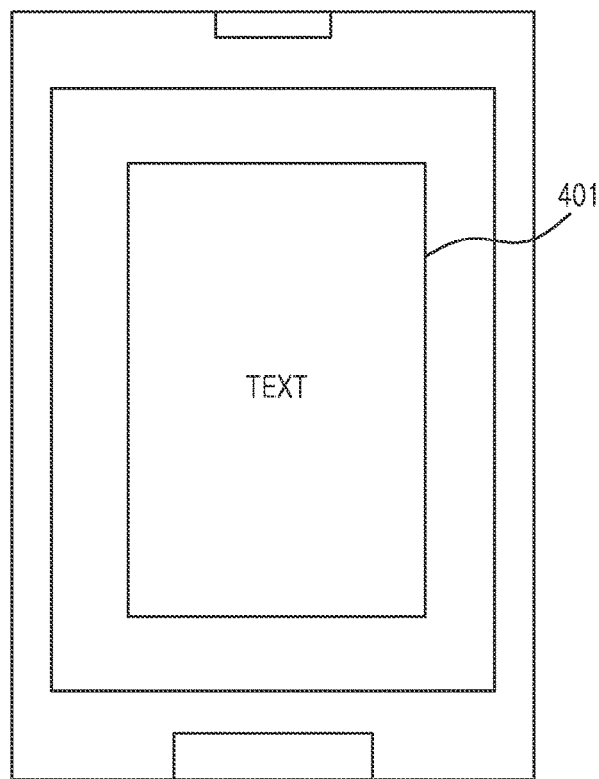
FIGS. 4A and 4B illustrate a stay value calculation by detecting a weight value of displayed contents according to an exemplary embodiment of the present invention.

FIGS. 4A and 4B illustrate a stay value calculation by detecting a weight value of displayed contents according to an exemplary embodiment of the present invention.

Referring to FIGS. 4A and 4B, it is provided that the electronic device accesses a certain website and the corresponding website includes a text 401 as shown in FIG. 4A, and the weight table is defined as shown in FIG. 4B. In this case, the electronic device detects the weight value of the contents displayed on the touch screen. Herein, the contents can include at least one of the text, the image, and the media player. More specifically, the media player can include a video file and a sound file, and the image can include a flash. The weight value of the contents can be defined by dividing the capacity of the contents displayed by the electronic device by the given weight value of the weight table.

First, the electronic device determines the type of the contents displayed on the touch screen. More specifically, the electronic device determines the content type of the current web page. For example, the electronic device can determine that the contents displayed on the touch screen include a text 401 based on the above-stated assumption. For example, the electronic device can confirm that the touch screen displays the text 401. The electronic device, confirming the content type displayed on the touch screen, detects the weight value according to the content type. More specifically, the electronic device detects the content capacity based on the content type, and detects the content weight value based on the detected content capacity using the set weight table. First, the electronic device detects the content capacity according to the content type. The electronic device detects the capacity of the text 401. Herein, the capacity of the text 401 can differ according to a size of the text 401.

The electronic device detects the content weight value according to the detected content capacity by referring to the set weight table. Herein, the weight table can arrange the weight values based on the content type and the content capacity. More specifically, the weight table assigns the weight value according to the content type and the content capacity. The weight value may be set to a default value or a particular value according to the user's selection. For example, the electronic device detects the weight value per content type currently detected, based on the set weight table. For example, it is provided that the electronic device detects the 150 KB-capacity text. In this case, the electronic device can obtain the weight value 1.5 as the text weight value. Thereafter, the electronic device adds up the detected weight values. More specifically, the electronic device calculates the weight value sum by adding up the detected weight values per content. Since the text weight value is 1 in this implementation, the electronic device can obtain the weight value 1.

The electronic device calculates the stay value using the weight value sum. Herein, the stay value can be defined as the product of the set time and the detected weight value sum on the content basis. For example, provided that the set time is 2 minutes, the electronic device can obtain the stay value 120 by multiplying the weight value sum 1 by the set time 120. Thereafter, the electronic device compares the calculated stay value and the set value, and automatically stores the content URL when the calculated stay value is greater than the set value. For example, provided that the set value is 100, the electronic device determines that the calculated stay value 120 is greater than the set value 100 and thus automatically stores the content URL. For example, even when the user browses the web page and finds his/her favorite contents, the related art has to manually store the corresponding content URL one by one. By contrast, an exemplary embodiment of the present electronic device can automatically store the content URL when the calculated stay value is greater than the set value. For example, an exemplary embodiment of the present invention can detect the user's favorite website by weighting the contents and store the corresponding URL, rather than merely storing the website accessed for a long time, to thus enhance the user access.

Figures 5A, 5B:
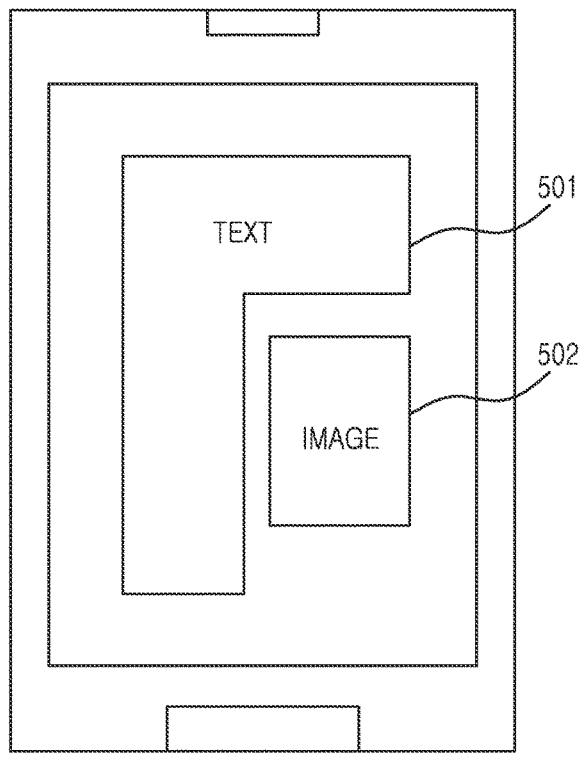
FIGS. 5A and 5B illustrate a stay value calculation by detecting a weight value of displayed contents according to an exemplary embodiment of the present invention.

FIGS. 5A and 5B illustrate a stay value calculation by detecting a weight value of displayed contents according to an exemplary embodiment of the present invention.

Referring to FIGS. 5A and 5B, it is provided that the electronic device accesses a certain website and the corresponding website includes a text 501 and an image 502 as shown in FIG. 5A, and the weight table is defined as shown in FIG. 5B. In this case, the electronic device detects the weight values of the contents displayed on the touch screen. Herein, the contents can include at least one of the text, the image, and the media player. More specifically, the media player can include a video file and a sound file, and the image can include a flash. The weight value of the contents can be defined by dividing the capacity of the contents displayed by the electronic device by the given weight value of the weight table.

First, the electronic device determines the type of the contents displayed on the touch screen. More specifically, the electronic device determines the content type of the current web page. For example, the electronic device can determine that the contents displayed on the touch screen include the text 501 and the image 502 based on the above-stated assumption. For example, the electronic device can confirm that the touch screen displays the text 501 and the image 502. The electronic device, confirming the content type displayed on the touch screen, detects the weight value according to the content type. More specifically, the electronic device detects the content capacity based on the content type, and detects the content weight value based on the detected content capacity using the set weight table. First, the electronic device detects the content capacity according to the content type. The electronic device detects the capacities of the text 501 and the image 502. Herein, the capacities of the text 501 and the image 502 can differ according to sizes of the text 501 and the image 502.

The electronic device detects the content weight value according to the detected content capacity by referring to the set weight table. Herein, the weight table can arrange the weight values based on the content type and the content capacity. More specifically, the weight table assigns the weight value according to the content type and the content capacity. The weight value may be set to a default value or a particular value according to the user's selection. For example, the electronic device detects the weight value per content type currently detected, based on the set weight table. For example, it is provided that the electronic device detects the 200 KB-capacity text 501 and the 600 KB-capacity image 502. In this case, the electronic device can identify the weight value 2 as the text weight value and the weight value 1.5 as the image weight value. Thereafter, the electronic device adds up the detected weight values. More specifically, the electronic device calculates the weight value sum by adding up the detected weight values per content. Since the text weight value is 2 and the image weight value is 1.5 in this implementation, the electronic device can obtain the weight value 3.5.

The electronic device calculates the stay value using the weight value sum. Herein, the stay value can be defined as the product of the set time and the detected weight value sum on the content basis. For example, provided that the set time is 4 minutes, the electronic device can obtain the stay value 600 by multiplying the weight value sum 2.5 by the set time 240. Thereafter, the electronic device compares the calculated stay value and the set value, and automatically stores the content URL when the calculated stay value is greater than the set value. For example, provided that the set value is 580, the electronic device determines that the calculated stay value 600 is greater than the set value 580 and thus automatically stores the content URL. For example, even when the user browses the web page and finds his/her favorite contents, the related art has to manually store the corresponding content URL one by one. By contrast, an exemplary embodiment of the present electronic device can automatically store the content URL when the calculated stay value is greater than the set value. For example, an exemplary embodiment of the present invention can detect the user's favorite website by weighting the contents and store the corresponding URL, rather than merely storing the website accessed for a long time, to thus enhance the user access.

Figures 6A, 6B:
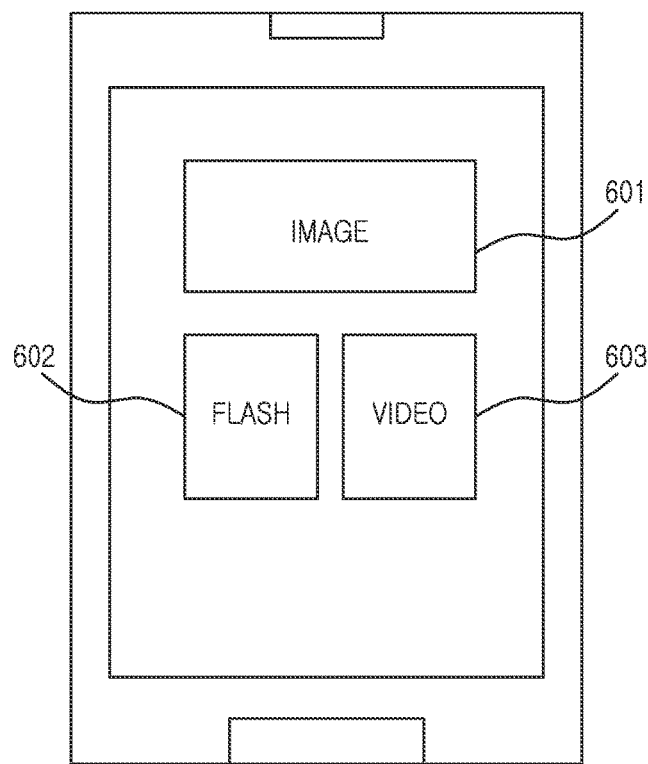
FIGS. 6A and 6B illustrate a stay value calculation by detecting a weight value of displayed contents according to an exemplary embodiment of the present invention.

FIGS. 6A and 6B illustrate a stay value calculation by detecting a weight value of displayed contents according to an exemplary embodiment of the present invention.

Referring to FIGS. 6A and 6B, it is provided that the electronic device accesses a certain website and the corresponding website includes an image 601, a flash 602, and a video 603 as shown in FIG. 6A, and the weight table is defined as shown in FIG. 6B. In this case, the electronic device detects the weight values of the contents displayed on the touch screen. Herein, the contents can include at least one of the text, the image, and the media player. More specifically, the media player can include a video file and a sound file, and the image can include a flash. The weight value of the contents can be defined by dividing the capacity of the contents displayed by the electronic device by the given weight value of the weight table.

First, the electronic device determines the type of the contents displayed on the touch screen. More specifically, the electronic device determines the content type of the current web page. For example, the electronic device can determine that the contents displayed on the touch screen include the image 601, the flash 602, and the video 603 based on the above-stated assumption. For example, the electronic device can confirm that the touch screen displays the image 601, the flash 602, and the video 603. The electronic device, confirming the content type displayed on the touch screen, detects the weight value according to the content type. More specifically, the electronic device detects the content capacity based on the content type, and detects the content weight value based on the detected content capacity using the set weight table. First, the electronic device detects the content capacity according to the content type. The electronic device detects the capacity of the image 601, the flash 602, and the video 603. Herein, the capacity of the image 601, the flash 602, and the video 603 can differ according to their sizes.

The electronic device detects the content weight value according to the detected content capacity by referring to the set weight table. Herein, the weight table can arrange the weight values according to the content type and the content capacity. More specifically, the weight table assigns the weight value according to the content type and the content capacity. The weight value may be set to a default value or a particular value according to the user's selection. For example, the electronic device detects the weight value per content type currently detected, based on the set weight table. For example, it is provided that the electronic device detects the 200 KB-capacity image 601, the 5 MB-capacity flash 602, and the 25 MB-capacity video 603. In this case, the electronic device can identify the image weight value 0.5, the flash weight value 0.5, and the video weight value 1. Thereafter, the electronic device adds up the detected weight values. More specifically, the electronic device calculates the weight value sum by adding up the detected weight values per content. Since the image weight value is 0.5, the flash weight value is 0.5, and the video weight value is 1 in this implementation, the electronic device can obtain the weight value 2.

The electronic device calculates the stay value using the weight value sum. Herein, the stay value can be defined as the product of the set time and the detected weight value sum on the content basis. For example, provided that the set time is 2 minutes, the electronic device can obtain the stay value 240 by multiplying the weight value sum 2 by the set time 120. Thereafter, the electronic device compares the calculated stay value and the set value, and automatically stores the content URL when the calculated stay value is greater than the set value. For example, provided that the set value is 100, the electronic device determines that the calculated stay value 240 is greater than the set value 100 and thus automatically stores the content URL. For example, even when the user browses the web page and finds his/her favorite contents, the related art has to manually store the corresponding content URL one by one. By contrast, an exemplary embodiment of the present electronic device can automatically store the content URL when the calculated stay value is greater than the set value. For example, an exemplary embodiment of the present invention can detect the user's favorite website by weighting the contents and store the corresponding URL, rather than merely storing the website accessed for a long time, to thus enhance the user access.

Figures 7A, 7B:
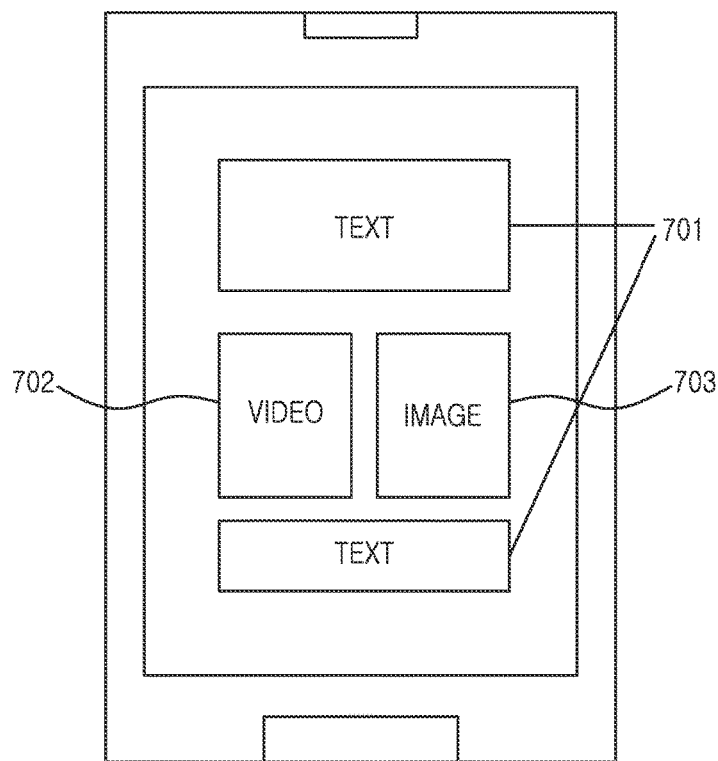
FIGS. 7A and 7B illustrate a stay value calculation by detecting a weight value of displayed contents according to an exemplary embodiment of the present invention.

FIGS. 7A and 7B illustrate a stay value calculation by detecting a weight value of displayed contents according to an exemplary embodiment of the present invention.

Referring to FIGS. 7A and 7B, it is provided that the electronic device accesses a certain website and the corresponding website includes a text 701, a video 702, and an image 703 as shown in FIG. 7A, and the weight table is defined as shown in FIG. 7B. In this case, the electronic device detects the weight values of the contents displayed on the touch screen. Herein, the contents can include at least one of the text, the image, and the media player. More specifically, the media player can include a video file and a sound file, and the image can include a flash. The weight value of the contents can be defined by dividing the capacity of the contents displayed by the electronic device by the given weight value of the weight value table.

First, the electronic device determines the type of the contents displayed on the touch screen. More specifically, the electronic device determines the content type of the current web page. For example, the electronic device can determine that the contents displayed on the touch screen include the text 701, the video 702, and the image 703 based on the above-stated assumption. For example, the electronic device can confirm that the touch screen displays the text 701, the video 702, and the image 703. The electronic device, confirming the content type displayed on the touch screen, detects the weight value according to the content type. More specifically, the electronic device detects the content capacity based on the content type, and detects the content weight value based on the detected content capacity using the set weight table. First, the electronic device detects the content capacity according to the content type. The electronic device detects the capacity of the text 701, the video 702, and the image 703. Herein, the capacity of the text 701, the video 702, and the image 703 can differ according to their sizes.

The electronic device detects the content weight value according to the detected content capacity by referring to the set weight table. Herein, the weight table can arrange the weight values based on the content type and the content capacity. More specifically, the weight table assigns the weight value according to the content type and the content capacity. The weight value may be set to a default value or a particular value according to the user's selection. For example, the electronic device detects the weight value per content type currently detected, based on the set weight table. For example, it is provided that the electronic device detects the 100 KB-capacity text 701, the 25 MB-capacity video 702, and the 400 KB-capacity image 703. In this case, the electronic device can identify the text weight value 1, the video weight value 1, and the image weight value 1. Thereafter, the electronic device adds up the detected weight values. More specifically, the electronic device calculates the weight value sum by adding up the detected weight values per contents. Since the text weight value is 1, the video weight value is 1, and the image weight value is 1 in this implementation, the electronic device can obtain the weight value 3.

The electronic device calculates the stay value using the weight value sum. Herein, the stay value can be defined as the product of the set time and the detected weight value sum on the content basis. For example, provided that the set time is 3 minutes, the electronic device can obtain the stay value 540 by multiplying the weight value sum 3 by the set time 180. Thereafter, the electronic device compares the calculated stay value and the set value, and automatically stores the content URL when the calculated stay value is greater than the set value. For example, provided that the set value is 500, the electronic device determines that the calculated stay value 540 is greater than the set value 500 and thus automatically stores the content URL. Even when the user browses the web page and finds his/her favorite contents, the related art has to manually store the corresponding content URL one by one. By contrast, an exemplary embodiment of the present electronic device can automatically store the content URL when the calculated stay value is greater than the set value. For example, an exemplary embodiment of the present invention can detect the user's favorite website by weighting the contents and store the corresponding URL, rather than merely storing the website accessed for a long time, to thus enhance the user access.

Figure 8:
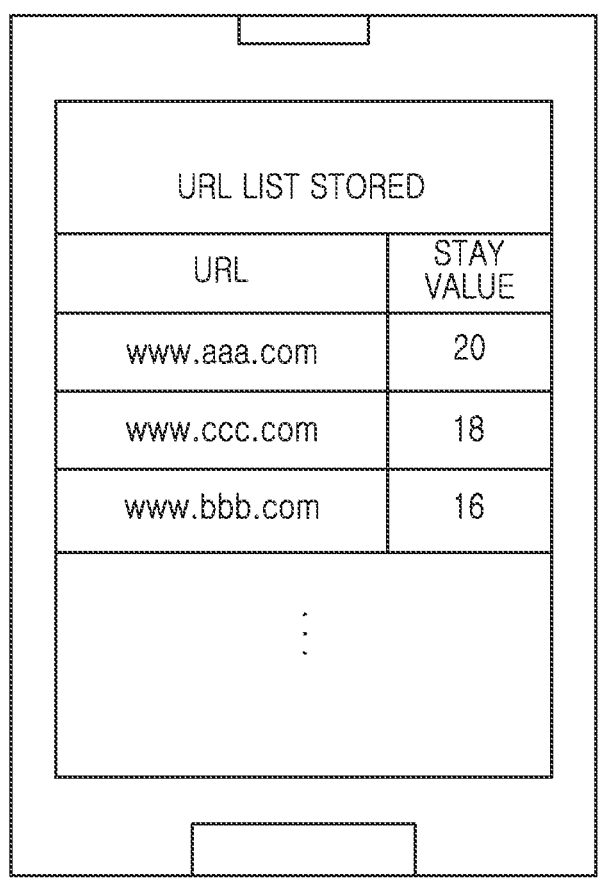
FIG. 8 illustrates content URLs automatically stored according to an exemplary embodiment of the present invention.

FIG. 8 illustrates content URLs automatically stored according to an exemplary embodiment of the present invention.

Referring to FIG. 8, the electronic device stores the content URL together with the calculated stay value. More specifically, as storing the content URL, the electronic device stores not only the URL but also the calculated stay value of the corresponding URL. For example, the electronic device stores the URL of www.aaa.com together with the calculated stay value of 20, stores the URL of www.bbb.com together with the calculated stay value of 16, and stores the URL of www.ccc.com together with the calculated stay value of 18.

Thereafter, the electronic device arranges the corresponding URLs in the descending order of the stored stay value. More specifically, the electronic device stores the URLs and the calculated stay values, and arranges the stored URLs in the order of the stored stay value. This is because the URL of the greater stay value indicates the longer search and browsing time at the corresponding URL. The fact that the user searches and browses the URL of the great stay value more often implies that the user is more interested in the corresponding URL. Hence, the electronic device puts the URL of the great stay value high in the stored URL list so that the user can easily select it. For example, the electronic device arranges the stored URL list in the descending order of the stay value and thus enhances the user's convenience.

Figure 9:
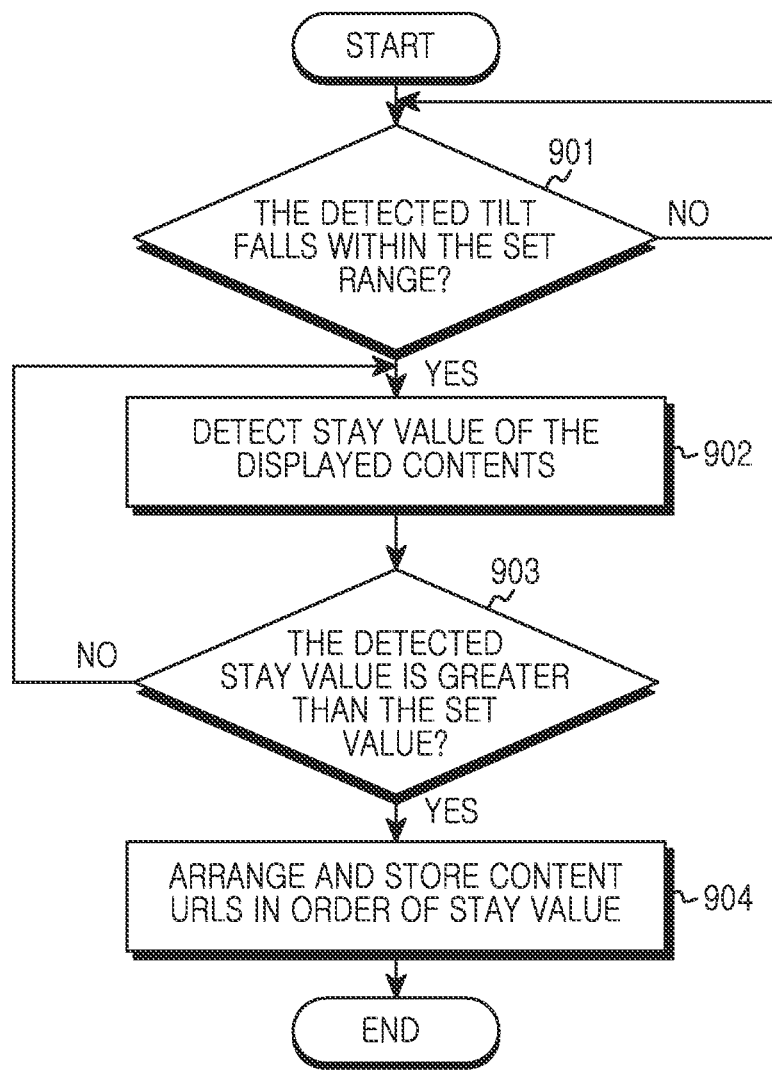
FIG. 9 is a flowchart illustrating an operating method of an electronic device according to an exemplary embodiment of the present invention.

FIG. 9 is a flowchart illustrating an operating method of an electronic device according to an exemplary embodiment of the present invention.

Referring to FIG. 9, the electronic device determines whether the detected tilt falls within the set range in step 901. More specifically, to determine whether the user actually browses the corresponding website, the electronic device detects its tilt which changes in real time and determines whether the tilt falls within the set range. The electronic device detects the tilt changing in real time in order to determine whether the user actually searches and browses the current website. For example, the electronic device detects the weight value of the displayed contents only when the detected tilt falls within the set range. Advantageously, when the touch screen of the electronic device has at the angle between 0 degree and 90 degrees, the electronic device can determine that the user is actually browsing the displayed website.

When the detected tilt falls within the set range, the electronic device detects the stay value of the displayed contents in step 902. More specifically, before detecting the stay value of the displayed contents, the electronic device detects the weight value of the contents displayed on the touch screen. To detect the weight value of the contents displayed on the touch screen, the electronic device determines the type of the contents displayed on the touch screen. More specifically, the electronic device determines the content type of the current web page. The electronic device detects the weight value according to the content type. More specifically, the electronic device detects the content capacity according to the content type, and detects the content weight value according to the detected content capacity by referring to the set weight table. First, the electronic device detects the content capacity according to the content type. For example, provided that the touch screen of the electronic device displays the text and the image, the electronic device detects the text capacity and the image capacity. Thereafter, the electronic device detects the content weight value according to the detected content capacity by referring to the set weight table. For example, it is provided that the electronic device detects the 100 KB-capacity text and the 600 KB-capacity image. In addition, it is provided that the electronic device identifies the weight value 1 of the 100 KB-capacity text and the weight value 1 of the 1200 KB-capacity image. In this case, the electronic device can confirm the text weight value 1 and the image weight value 0.5. The electronic device adds up the detected weight values. More specifically, the electronic device calculates the weight value sum by adding up the detected weight values per content. Since the text weight value is 1 and the image weight value is 0.5 in this implementation, the electronic device can obtain the weight value 1.5 by adding the detected text weight value 1 and the detected image weight value 0.5. Thereafter, the electronic device calculates the stay value using the weight value sum. Herein, the stay value can be defined as the product of the set time and the detected weight value sum on the content basis. For example, provided that the set time is 3 minutes, the electronic device can obtain the stay value 270 by multiplying the weight value sum 1.5 by the set time 180.

In step 903, the electronic device determines whether the calculated stay value is greater than the set value. More specifically, the electronic device compares the calculated stay value and the set value, and automatically stores the content URL when the calculated stay value is greater than the set value. For example, provided that the set value is 250, the electronic device determines that the calculated stay value 270 is greater than the set value 250 and thus automatically stores the content URL. By contrast, provided that the set value is 300, the electronic device determines that the calculated stay value is smaller than the set value and thus does not store the content URL.

When the calculated stay value is greater than the set value, the electronic device stores and arranges the content URLs in the order of the stay value in step 904. More specifically, the electronic device stores the URL and the calculated stay value together, and arranges the stores URLs in the order of the stored stay value. This is because the URL of the greater stay value indicates the longer search and browsing time at the corresponding URL. For example, the fact that the user searches and browses the URL of the great stay value more often implies that the user is more interested in the corresponding URL. Hence, the electronic device puts the URL of the great stay value high in the stored URL list so that the user can easily select it. For example, the electronic device arranges the stored URL list in the descending order of the stay value and thus enhances the user's convenience.

When the detected tilt does not fall within the set range in step 901, the electronic device repeats step 901. When the calculated stay value is smaller than the set value in step 903, the electronic device redetects the stay value of the displayed contents.

Figure 10:
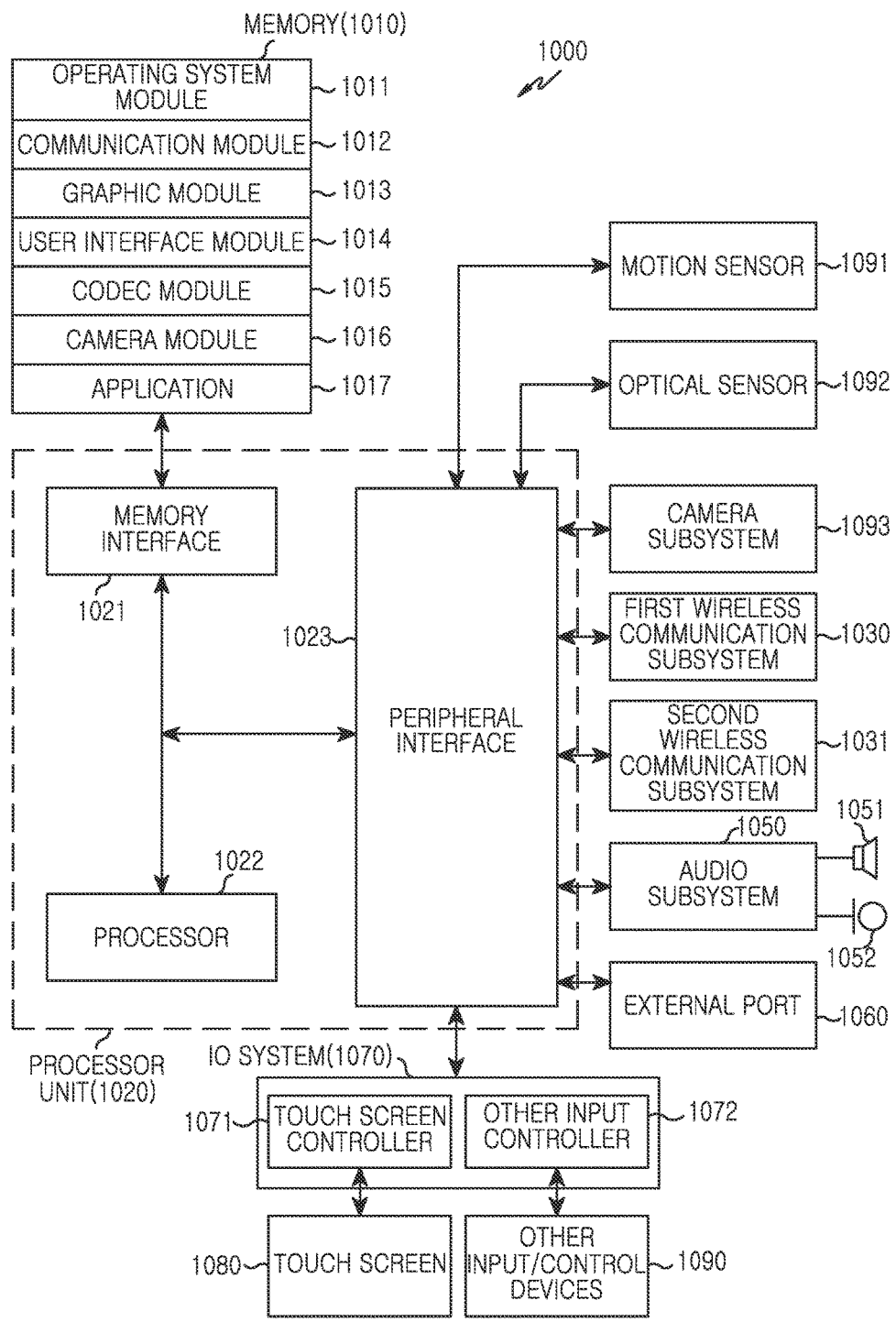
FIG. 10 is a block diagram of an electronic device according to an exemplary embodiment of the present invention.

FIG. 10 is a block diagram of an electronic device according to an exemplary embodiment of the present invention.

Referring to FIG. 10, an electronic device 1000 can be a portable electronic device, such as a portable terminal, a mobile phone, a mobile pad, a media player, a tablet computer, a handheld computer, a Personal Digital Assistant (PDA), or the like. The electronic device 1000 may be a portable electronic device combining two or more functions of those devices.

The electronic device 1000 includes a memory 1010, a processor unit 1020, a first wireless communication subsystem 1030, a second wireless communication subsystem 1031, an external port 1060, an audio subsystem 1050, a speaker 1051, a microphone 1052, an Input Output (IO) system 1070, a touch screen 1080, and other input or control devices 1090. A plurality of memories 1010 and a plurality of external ports 1060 can be used.

The processor unit 1020 can include a memory interface 1021, one or more processors 1022, and a peripheral interface 1023. In some cases, the processor unit 1020 may be referred to as the processor. The processor unit 1020 detects the weight value of the displayed contents and calculates the stay value using the detected weight value. The processor unit 1020 determines that the detected tilt falls within the set tilt range, determines the type of the displayed contents, detects the weight value according to the content type, and adds the detected weight values. The processor unit 1020 detects the content capacity according to the content type, and detects the content weight value according to the detected content capacity by referring to the set weight table. The processor unit 1020 compares the calculated stay value and the set value.

The processor 1022 performs various functions for the electronic device 1000 by running various software programs, and processes and controls voice communication and data communication. In addition to such typical functions, the processor 1022 also executes particular software modules (instruction sets) stored in memory 1010 and performs various particular functions corresponding to the modules. For example, the processor 1022 carries out exemplary methods in association with the software modules stored in the memory 1010.

The processor 1022 can include one or more data processors, an image processor, or a CODEC. The data processor, the image processor, or the CODEC may be separately provided. Alternatively, the processor 1022 may include a plurality of processors for performing different functions. The peripheral interface 1023 connects the IO subsystem 1070 and various peripherals of the electronic device 1000 to the processor 1022 and the memory 1010 (through the memory interface 1021).

The various components of the electronic device 1000 can be coupled using one or more communication buses or one or more stream lines.

The external port 1060 is used to connect the portable electronic device to other electronic device directly or indirectly via a network (e.g., Internet, intranet, and wireless LAN). The external port 1060 can be, for example, but not limited to, a Universal Serial Bus (USB) port or a FIREWIRE port.

A motion sensor 1091 and an optical sensor 1092 are coupled to the peripheral interface 1023 to allow various functions. For example, the motion sensor 1091 and the optical sensor 1092 are coupled to the peripheral interface 1023 to detect a motion of the electronic device and the light from the outside. Besides these, a positioning system and other sensors, such as a temperature sensor or a bionic sensor, can be coupled to the peripheral interface 1023 to perform their functions. The motion sensor 1091 detects the tilt.

A camera subsystem 1093 can perform camera functions, such as photo and video clip recording.

The optical sensor 1092 can employ a Charged Coupled Device (CCD) or a Complementary Metal-Oxide Semiconductor (CMOS) device.

The communication function is conducted through the one or more wireless communication subsystems 1030 and 1031. The wireless communication subsystems 1030 and 1031 can include radio frequency receiver and transmitter and/or optical (e.g., an infrared light) receiver and transmitter. The first wireless communication subsystem 1030 and the second wireless communication subsystem 1031 can be distinguished based on a communication network of the electronic device 1000. For example, the communication network can include a communication subsystem designed to operate over, but not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network and/or a Bluetooth network. The first wireless communication subsystem 1030 and the second wireless communication subsystem 1031 may be integrated into a single wireless communication subsystem.

The audio subsystem 1050 can be coupled to the speaker 1051 and the microphone 1052 to process audio stream input and output, such as voice recognition, voice reproduction, digital recording, and telephone function. For example, the audio subsystem 1050 communicates with the user through the speaker 1051 and the microphone 1052. The audio subsystem 1050 receives a data signal through the peripheral interface 1023 of the processor unit 1020 and converts the received data signal to an electric signal. The converted electric signal is fed to the speaker 1051. The speaker 1051 converts the electric signal to a sound wave audible by the user and outputs the sound wave. The microphone 1052 converts the sound wave from the user or other sound sources to an electric signal. The audio subsystem 1050 receives the converted electric signal from the microphone 1052. The audio subsystem 1050 converts the received electric signal to the audio data signal and sends the converted audio data signal to the peripheral interface 1023. The audio subsystem 1050 can include an attachable and detachable ear phone, head phone, or head set.

The IO subsystem 1070 can include a touch screen controller 1071 and/or another input controller 1072. The touch screen controller 1071 can be coupled to the touch screen 1080. The touch screen 1080 and the touch screen controller 1071 can detect the contact and the motion or their abortion using, but not limited to, capacitive, resistive, infrared and surface sound wave techniques for determining one or more contact points with the touch screen 1080 and a multi-touch detection technique including various proximity sensor arrays or other elements. The other input controller 1072 can be coupled to the other input/control devices 1090. The other input/control devices 1090 can employ one or buttons, a rocker switch, a thumb wheel, a dial, a stick, and/or a pointer, such as a stylus.

The touch screen 1080 provides an I/O interface between the electronic device 1000 and the user. For example, the touch screen 1080 forwards the user's touch input to the electronic device 1000. The touch screen 1080 also functions as a medium for displaying the output of the electronic device 1000 to the user. For example, the touch screen 1080 represents a visual output to the user. Such a visual output can be represented as text, graphic, video, and a combination of these.

The touch screen 1080 can employ various displays, examples of which include, but are not limited to, a Liquid Crystal Display (LCD), a Light Emitting Diode (LED), a Light emitting Polymer Display (LPD), an Organic LED (OLED), an Active Matrix OLED (AMOLED), a Flexible LED (FLED), or the like.

The memory 1010 can be coupled to the memory interface 1021. The memory 1010 can include a fast Random Access Memory (RAM), such as one or more magnetic disc storage devices and/or a non-volatile memory, one or more optical storage devices, and/or a flash memory (e.g., NAND and NOR).

The memory 1010 stores software. Software components include an operating system module 1011, a communication module 1012, a graphic module 1013, a user interface module 1014, a CODEC (Motion Pictures Expert Group (MPEG)) module 1015, a camera module 1016, and one or more application modules 1017. The modules being the software components can be represented as a set of instructions, and thus, the module can be referred to as an instruction set. In addition, the module may be referred to as a program. The operating system software 1011 (the embedded operating system, such as WINDOWS, LINUX, Darwin, RTXC, UNIX, OS X, or VxWorks) includes various software components for controlling general system operations. These include, e.g., memory management and control, storage hardware (device) control and management, and power control and management. The operating system software 1011 processes the normal communication between various hardware (devices) and software components (modules). When the calculated stay value is greater than the set value, the memory 1010 stores the content URL together with the calculated stay value.

The communication module 1012 allows communication with other electronic device, such as a computer, a server, and/or a portable terminal, through the wireless communication subsystems 1030 and 1031 or the external port 1060.

The graphic module 1013 includes various software components for providing and displaying graphics on the touch screen 1080. The term 'graphics' encompasses a text, a web page, an icon, a digital image, a video, and an animation. The touch screen 1080 displays a message inquiring about a smart rotation function and receives a certain region selected in the message.

The user interface module 1014 includes various software components relating to a user interface. The user interface module 1014 is involved in the status change of the user interface and the condition of the user interface status change.

The CODEC module 1015 can include software components relating to video file encoding and decoding. The CODEC module 1015 can include a video stream module, such as an MPEG module and/or an H204 module. The CODEC module 1015 can include various audio file CODEC modules for AAA, AMR, and WMA. The CODEC module 1015 includes instruction sets corresponding to the exemplary methods of the present invention as described herein.

The camera module 1016 includes camera related software components allowing camera related processes and functions.

The application module 1017 includes a browser, an e-mail, an instant message, a word processing, a keyboard emulation, an address book, a touch list, a widget, Digital Right Management (DRM), a voice recognition, a voice reproduction, a position determining function, and a location based service.

The various functions of the electronic device 1000 as stated above and to be explained, can be executed by hardware and/or software and/or their combination including one or more stream processing and/or Application Specific Integrated Circuits (ASICs).

As set forth above, an electronic device and a method for automatically storing a URL by calculating a content stay value can calculate the stay value of the displayed contents and automatically stores the content URL.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of an electronic device, the method comprising:
    in response to accessing a website, detecting, by a processor, weight value for each of website contents displayed on a screen, wherein the detecting of the weight value of the displayed website contents comprises:
        determining type and size for each of the displayed website contents;
        determining the weight value for each of the displayed website contents according to the determined content type and the content size by referring to a predetermined weight table; and
        determining, by the processor, a stay value for the website using a sum of the detected weight value for each of the displayed website contents; and
    when the determined stay value is greater than a set value, storing, by a memory, a Uniform Resource Locator (URL) of the website,
    wherein the weight value for the website content increases as a capacity of the website content increases.

2. The method of claim 1, further comprising:
    detecting a tilt using at least one of a gravity sensor and a gyro sensor; and
    determining that the detected tilt falls within a set tilt range.

3. The method of claim 1, wherein the website contents comprise at least one of a text, an image, and a media player.

4. The method of claim 1, wherein the weight table assigns the weight value according to the content type.

5. The method of claim 1, wherein the stay value for the website is a product of the sum of the detected weight value and a set time.

6. The method of claim 1, further comprising:
    comparing the determined stay value and the set value.

7. The method of claim 1, wherein the storing of the content URL comprises:
    storing the URL and the determined stay value together.

8. The method of claim 7, wherein the stored URL is arranged in a descending order of the stored stay value.

9. An electronic device comprising:
    a processor configured to:
        in response to accessing a website, detect weight value for each of website contents displayed on a screen,
        determine type and size for each of the displayed website contents,
        determine the weight value for each of the displayed website contents according to the determined content type and the content size by referring to a predetermined weight table, and
        determine a stay value for the website using a sum of the detected weight value for each of the displayed website contents; and
    a memory configured to, when the determined stay value is greater than a set value, store a Uniform Resource Locator (URL) of the website,
    wherein the weight value increases as a size of the displayed website content increases.

10. The electronic device of claim 9, further comprising:
    a motion sensor configured to detect a tilt,
    wherein the processor is further configured to determine that the detected tilt falls within a set tilt range.

11. The electronic device of claim 9, wherein the website contents comprise at least one of a text, an image, and a media player.

12. The electronic device of claim 9, wherein the weight table assigns the weight value according to the content type.

13. The electronic device of claim 9, wherein the stay value for the website is a product of the sum of the detected weight value and a set time.

14. The electronic device of claim 9, wherein the processor is further configured to compare the determined stay value and the set value.

15. The electronic device of claim 9, wherein the memory is further configured to store the URL and the determined stay value together.

16. The electronic device of claim 15, wherein the stored URL is arranged in a descending order of the stored stay value.

17. The method of claim 4, wherein the weight value for a content with a designated size in the weight table is determined based on a time required for perceiving the content in a webpage.

18. The electronic device of claim 12, wherein the weight value for a content with a designated size in the weight table is determined based on a time required for perceiving the content in a webpage.

* * * * *